(12) United States Patent
Hsiao et al.

(10) Patent No.: US 6,687,083 B2
(45) Date of Patent: Feb. 3, 2004

(54) ENHANCED LOW PROFILE MAGNET WRITE HEAD

(75) Inventors: Wenchein Hsiao, San Jose, CA (US); Edward Hin Pong Lee, San Jose, CA (US); Neil Leslie Robertson, Palo Alto, CA (US); Hugo Alberto Emilio Santini, San Jose, CA (US); Joseph Francis Smyth, Aptos, CA (US); Samuel Wei-san Yuan, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 133 days.

(21) Appl. No.: 09/935,361

(22) Filed: Aug. 22, 2001

(65) Prior Publication Data

US 2003/0039067 A1 Feb. 27, 2003

(51) Int. Cl.[7] ............................................... G11B 5/147
(52) U.S. Cl. ....................................................... 360/126
(58) Field of Search ......................................... 360/126

(56) References Cited

U.S. PATENT DOCUMENTS 4,458,279 A 7/1984 Katz
5,621,596 A * 4/1997 Santini ........................ 360/126
5,798,897 A * 8/1998 Chang et al. ............... 360/126
6,181,514 B1 * 1/2001 Santini et al. .............. 360/126

FOREIGN PATENT DOCUMENTS

| JP | 58-100212 | 6/1983 |
| JP | 58-111116 | 7/1983 |
| JP | 58-128012 | 7/1983 |
| JP | 58-128017 | 7/1983 |
| JP | 3-252909 | 11/1991 |

* cited by examiner

Primary Examiner—Robert S. Tupper
(74) Attorney, Agent, or Firm—William D. Gill

(57) ABSTRACT

An low profile inductive write head is provided to improve track definition and head efficiency and to reduce overcoat and pole tip protrusion and cracking caused by thermal expansion. A first insulation layer of an insulation stack enclosing the coil layer is formed of an non-magnetic inorganic insulator material such as aluminum oxide, silicon dioxide or titanium dioxide having a thickness of in the range of 0.2–0.3 microns. The thinner first insulation layer results in a significantly reduced slope of the insulation stack which decreases reflective notching during processing of the second pole tip to improve track definition. Improved thermal conduction properties of the inorganic insulator material improves heat sinking of the write coil reducing overcoat and pole tip protrusion and cracking at the pole tip/write gap layer interface.

18 Claims, 6 Drawing Sheets

ENHANCED LOW PROFILE MAGNET WRITE HEAD

BACKGROUND OF THE INVENTION

1. Field of the Invention

This invention relates to magnetic transducers particularly applicable to magnetic disk drive systems. More particularly, the invention relates to thin film inductive heads having a reduced profile to improve track definition and heat dissipation.

2. Description of the Related Art

Thin film magnetic read/write heads are used for reading and writing magnetically coded data stored on a magnetic storage medium such as a magnetic disk or a magnetic tape. There is a continuing strongly-felt need for increasing the data storage density in such media. Most efforts to increase magnetic storage density involve techniques for increasing the areal bit density in the magnetic medium.

In rotating magnetic disk drives, the areal density is the product of the number of flux reversals per millimeter along a data track and the number of tracks available per millimeter of disk radius. Thus, high areal data storage density requires recording heads with high linear resolution and narrow track width.

A thin film inductive write head includes one or more coil layers imbedded in an insulation stack, the insulation stack being sandwiched between first and second pole piece layers. A write gap is formed in a pole tip region by provision of a gap layer between the pole pieces. The pole pieces are magnetically coupled in a back region. Between the pole tip region and the back gap region is a yoke region where the pole piece layers separate from one another to accomodate the insulation stack. The insulation stack typically includes a first insulation layer (I1) on the first pole piece layer, one or more coil layers on the first insulation layer, a second insulation layer (I2) over the coil layer and a third insulation layer (I3) over the second insulation layer.

A combined head, such as a merged magnetoresistive (MR) head, includes the aforementioned write head as a write head portion combined with an MR read head portion. The MR read head portion includes an MR sensor which is sandwiched between first and second gap layers which are in turn sandwiched between first and second shield layers. In a merged MR head, a single layer serves a double function as a second shield layer for the read head and as a first pole piece for the write head. The combined head is carried on a slider which, in turn, is mounted on a suspension in a magnetic disk drive. The suspension is mounted on an actuator which moves the combined head over selected tracks on a rotating disk for reading and writing signals thereon. As disk rotates a cushion of air is developed to provide an air bearing between the disk and the slider which counterbalances a loading force exerted by the suspension. A surface of the slider facing the disk is called an air bearing surface (ABS) and is typically spaced from the disk in the order of 0.050 μm when the disk is rotating.

In the fabrication of a thin film magnetic write head it is important that zero throat height (ZTH) be accurately located. The ZTH is the distance along a normal to the ABS between the ABS and a first location where the first and second pole piece layers separate due to topography of one of the insulation layers in the aforementioned insulation stack. Typically an apex of the first insulation layer defines the ZTH. The apex is the foremost end of the insulation layer closest to the ABS. The first insulation layer is hard baked resist which imposes on the layer an upwardly sloping surface which commences at the apex forming an apex angle with the plane of the write gap layer. Accordingly, the sloping surface of the first insulation layer angles toward the second pole piece, causing an angled separation of the first and second pole piece layers which commences at the apex. The apex angles of the first, second and third insulation layers cause pronounced slopes which rise from the ZTH and face the pole tip region. After hard baking these layers high optical reflectivity presents a problem in the fabrication of the second pole tip.

For good magnetic operation, it is desirable that the sidewalls of the second pole tip be planar and perpendicular to the ABS. One approach is to make the tracks wider, however, this reduces the storage density of the disk. Therefore, in order to maintain high storage density, the art has endeavored to make the sidewalls of the pole tip regular. Two design considerations make this endeavor difficult. First, the first and second pole piece layers must separate as near as possible to the ABS in order to minimize flux transfer between the pole tips behind the ABS. This requires that the distance between the ABS and the ZTH be minimized. Second, the second pole piece should widen as near as possible to the ABS to minimize saturation of the second pole tip. This widening commences at the "flare point". The ZTH is typically located between the ABS and the flare point. When both the ZTH and the flare point are close to the ABS, the optical reflectivity of the front slope of the insulation stack presents a problem in the fabrication of the second pole tip.

The second pole tip is constructed by spinning a thick photoresist layer on top of the insulation stack, over the site of the second pole tip. Ultraviolet light is then directed onto the photoresist through a mask that outlines the shape of the second pole tip. In the prior art, the flare point is behind the ZTH, over the front sloping reflective surface of the insulation stack. That portion of the ultraviolet light which is directed behind the flare point is reflected from the front slope of the insulation stack, enlarging the exposure of the photoresist on each side of the intended sidewalls of the second pole tip. When the photoresist is developed, the photoresist mask at the second pole tip region may be undesirably wide. This undesirably widens the second pole tip which leads to its irregularity.

Another problem with the insulation stack is that the insulator layers formed of baked resist are relatively thick due to the spin coating process used to deposit the resist material. The baked resist is a relatively poor thermal conductor resulting in heating of the write head due slow dissipation of heat generated in the coil layer when the write head is operated.

A further problem with the insulation stack is its proximity to the ABS. Unfortunately, the coefficients of expansion of the materials of the insulation stack and the pole piece layers are markedly different. When the write head is operated the coil layers generate heat, which causes expansion of the insulation stack and pole pieces. The material of the insulation stack expands more than the alumina overcoat and the pole pieces causing the overcoat and the pole tips to protrude beyond the ABS of the slider. This same expansion of the insulation stack can also cause cracking at interface of the second pole and the write gap at the ABS.

Accordingly, there is a strong felt need to overcome or minimize the aforementioned problems associated with prior art inductive write heads.

SUMMARY OF THE INVENTION

It is an object of the present invention to disclose an inductive write head having a thinner insulator stack layer.

It is another object of the present invention to disclose an inductive write head having a reduced apex angle and a lower profile.

It is a further object of the present invention to disclose an inductive write head having a reduced yoke length.

It is yet another object of the present invention to disclose an inductive write head which does not exhibit a large overcoat and pole tip protrusion and cracking between layers due to expansion of the insulation stack.

It is still another object of the present invention to disclose an inductive write head using a thin insulator material for the first insulator layer of the insulator stack.

It is a still further object of the present invention to disclose a method for making an inductive write head having a reduced apex angle, a low profile, a thinner insulator stack and a reduced yoke length.

It is a still further object of the present invention to disclose an inductive write head having improved heat dissipation upon operation of the write coil.

In accordance with the principles of the present invention, there is disclosed an inductive write head having a first insulation layer of a coil insulation stack formed of aluminum oxide. Because of the good electrical insulative properties of aluminum oxide, the first insulator layer of the coil insulation stack can be made having a thickness in the range of 0.2–0.3 microns. This thin first insulator layer together with a reduced thickness second insulation layer results in a lower profile write head having a reduced apex angle and a reduced yoke length. The reduced yoke length is achieved by making the coil layer closer to the first pole piece (P1) due to the thinner first insulator layer so that the coil can be moved closer to the ABS without a detrimental effect on the apex angle.

The thin first insulator layer of aluminum oxide has good thermal conductance resulting in improved heat sinking of the coil layer of the write head reducing pole tip protrusion and cracking at the pole tip/write gap layer interface layer due to expansion of the insulation stack.

BRIEF DESCRIPTION OF THE DRAWINGS

For a fuller understanding of the nature and advantages of the present invention, as well as of the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
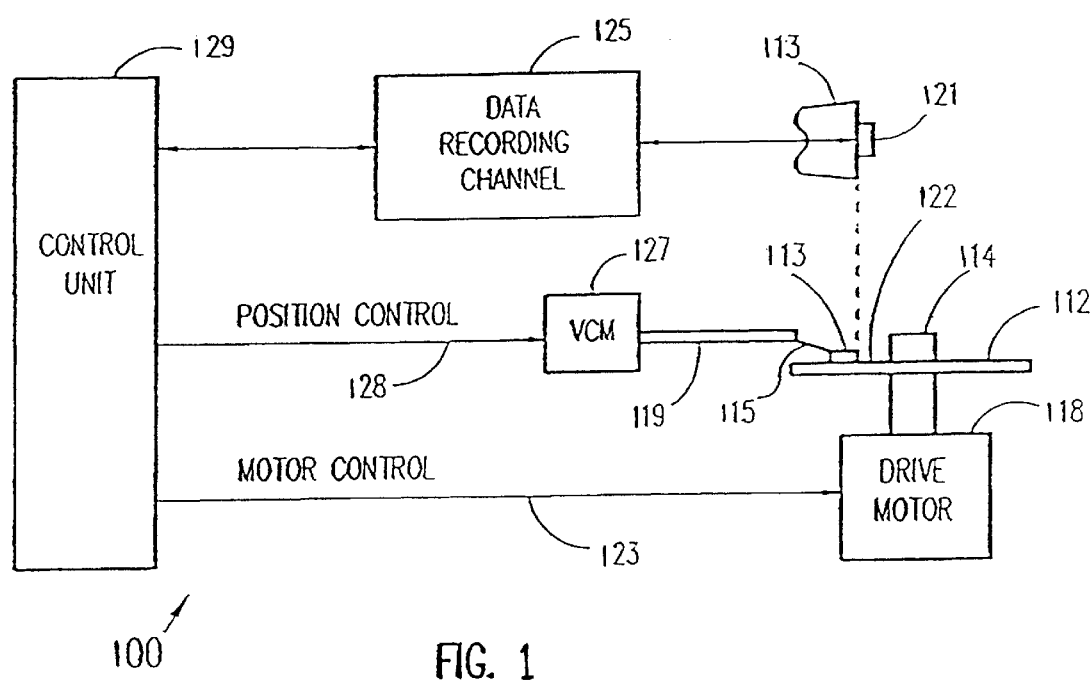
FIG. 1 is a simplified diagram of a magnetic recording disk drive system using the inductive write head of the present invention.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on the disk 112.

At least one slider 113 is positioned on the disk 112, each slider 113 supporting one or more magnetic read/write heads 121 where the head 121 incorporates the SV sensor of the present invention. As the disks rotate, the slider 113 is moved radially in and out over the disk surface 122 so that the heads 121 may access different portions of the disk where desired data is recorded. Each slider 113 is attached to an actuator arm 119 by means of a suspension 115. The suspension 115 provides a slight spring force which biases the slider 113 against the disk surface 122. Each actuator arm 119 is attached to an actuator 127. The actuator as shown in FIG. 1 may be a voice coil motor (VCM). The VCM comprises a coil movable within a fixed magnetic field, the direction and speed of the coil movements being controlled by the motor current signals supplied by a controller 129.

During operation of the disk storage system, the rotation of the disk 112 generates an air bearing between the slider 113 (the surface of the slider 113 which includes the head 121 and faces the surface of the disk 112 is referred to as an air bearing surface (ABS)) and the disk surface 122 which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by the control unit 129, such as access control signals and internal clock signals. Typically, the control unit 129 comprises logic control circuits, storage chips and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the disk 112. Read and write signals are communicated to and from the read/write heads 121 by means of the recording channel 125. Recording channel 125 may be a partial response maximum likelihood (PMRL) channel or a peak detect channel. The design and implementation of both channels are well known in the art and to persons skilled in the art. In the preferred embodiment, recording channel 125 is a PMRL channel.

The above description of a typical magnetic disk storage system, and the accompanying illustration of FIG. 1 are for representation purposes only. It should be apparent that disk storage systems may contain a large number of disks and actuator arms, and each actuator arm may support a number of sliders.

Figure 2:
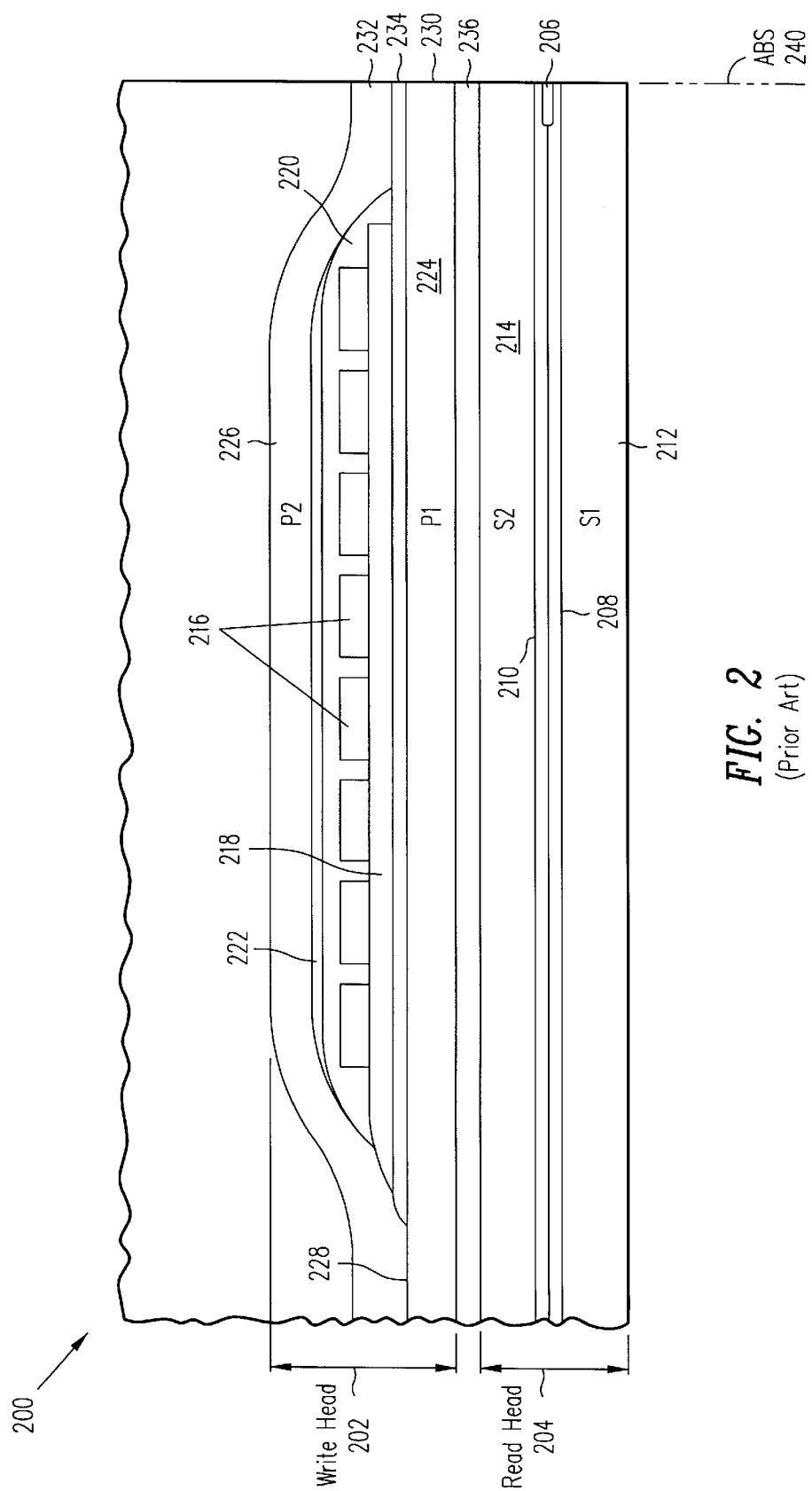
FIG. 2 is a vertical cross-section view, not to scale, of a "piggyback" read/write magnetic head.

FIG. 2 is a side cross-sectional elevation view of a "piggyback" magnetic read/write head 200, which includes a write head portion 202 and a read head portion 204, the read head portion employing a magnetoresistive (MR) sensor 206. The MR sensor 206 is sandwiched between nonmagnetic insulative first and second read gap layers 208 and 210, and the read gap layers are sandwiched between ferromagnetic first and second shield layers 212 and 214. In response to external magnetic fields, the resistance of the MR sensor 206 changes. A sense current $I_S$ conducted through the sensor causes these resistance changes to be manifested as potential changes. These potential changes are then processed as readback signals by the processing circuitry of the data recording channel 146 shown in FIG. 1.

The write head portion 202 of the magnetic read/write head 200 includes a coil layer 216 sandwiched between first and second insulation layers 218 and 220. A third insulation layer 222 may be employed for planarizing the head to eliminate ripples in the second insulation layer 220 caused by the coil layer 216. The first, second and third insulation layers are referred to in the are as an insulation stack. The coil layer 216 and the first, second and third insulation layers 218, 220 and 222 are sandwiched between first and second pole piece layers 224 and 226. The first and second pole piece layers 224 and 226 are magnetically coupled at a back gap 228 and have first and second pole tips 230 and 232 which are separated by a write gap layer 234 at the ABS 240. An insulation layer 236 is located between the second shield layer 214 and the first pole piece layer 224. Since the second shield layer 214 and the first pole piece layer 224 are separate layers this read/write head is known as a "piggyback" head.

Figure 3:
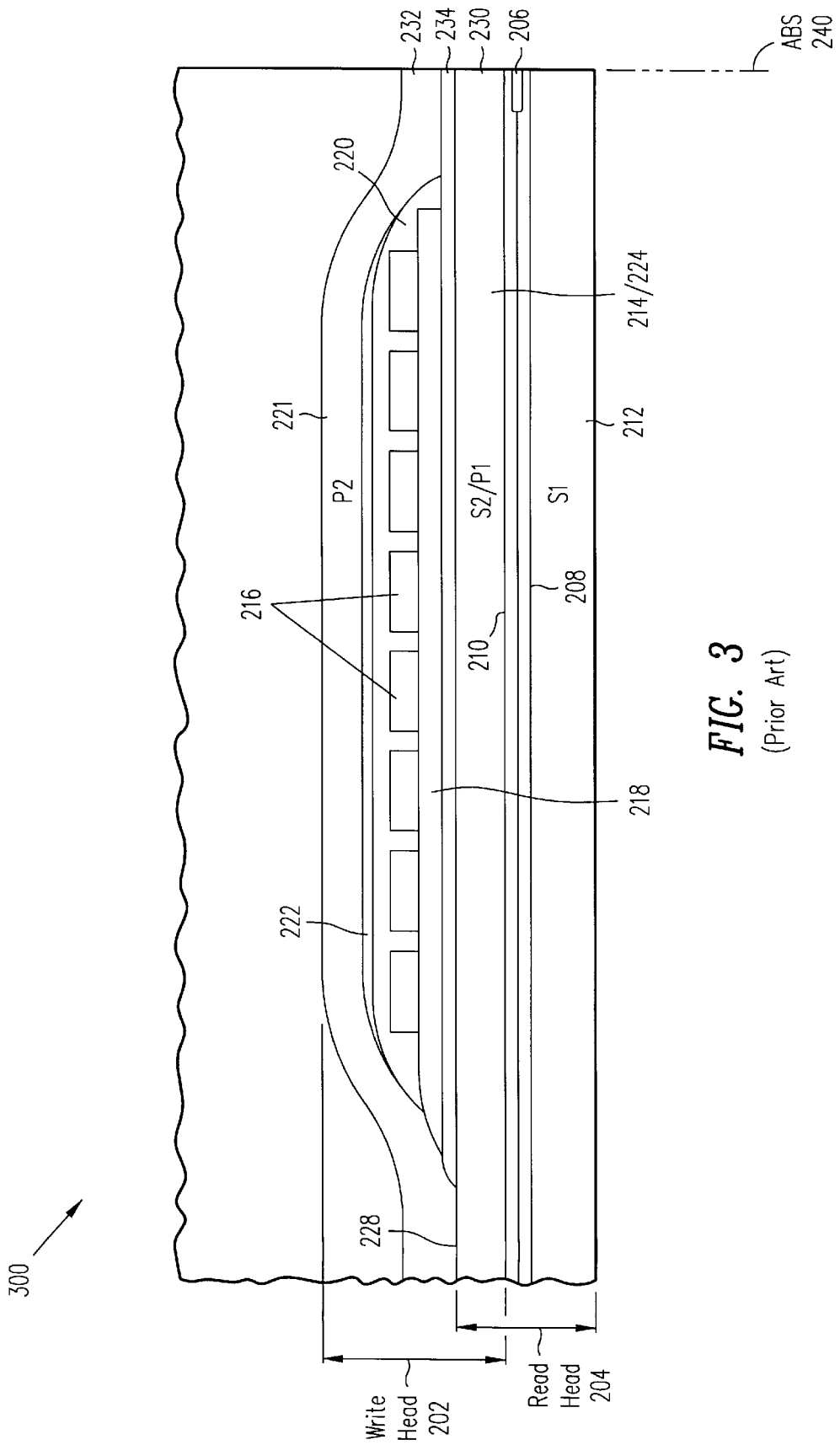
FIG. 3 is a vertical cross-section view, not to scale, of a "merged" read/write magnetic head.

FIG. 3 is the same as FIG. 2 except the second shield layer 214 and the first pole piece layer 224 are a common layer. This type of read/write head is known as a "merged" head 300. The insulation layer 236 of the piggyback head in FIG. 2 is omitted in the merged head 300 of FIG. 3.

EXAMPLE 1

Figure 4:
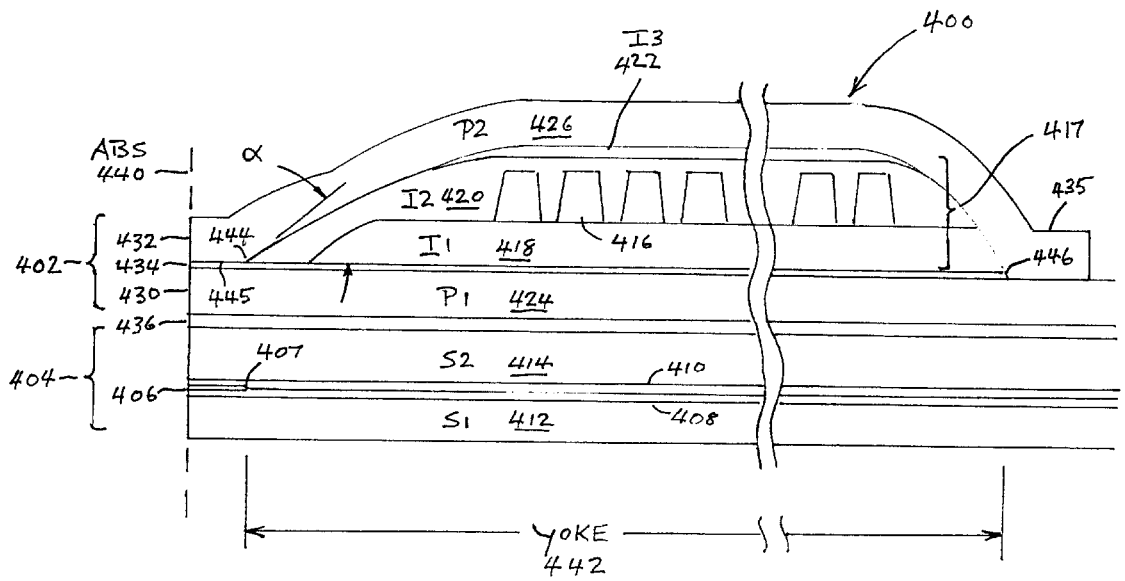
FIG. 4 is a vertical cross-section view, not to scale, of a read/write magnetic head.

A first example of a piggyback read/write head 400 is shown in FIG. 4. The read/write magnetic head 400 has a write head portion 402 and a read head portion 404. The read head portion 404 includes an MR sensor 406 which is sandwiched between the first and second gap layers 408 and 410, the first and second gap layers, in turn, being sandwiched between first and second shield layers 412 and 414. In response to external magnetic fields, the resistance of the MR sensor 406 changes. A sense current conducted through the sensor causes these changes to be manifested as potential changes. These potential changes are processed by the processing circuitry of the recording channel 125 shown in FIG. 1.

It is important that a recessed end 407 of the MR sensor 406 be accurately located within the head with respect to the ABS 440 so that the MR sensor 406 presents an appropriate resistance to the sense current. The amount of resistance of the MR sensor 406 is inversely proportional to its stripe height, which is the distance between the ABS and the recessed end 407 of the MR sensor 406. Typically, stripe height is determined by the amount of lapping the front of the head undergoes to define the ABS 440.

The write head portion 402 of the head includes a coil layer 416 and an insulation stack 417 comprising first, second and third insulation layers 418, 420 and 422. The coil layer 416 is sandwiched between the first and second insulation layers 418 and 420. The third insulation layer 422 is used for planarizing the head to eliminate ripples in the second insulation layer caused by the coil layer 416. The coil layer 416, and the first, second and third insulation layers 418, 420 and 422 are sandwiched between first and second pole piece layers 424 and 426. The first and second pole piece layers 424 and 426 are separated by a write gap layer 434 at the ABS 440 and are magnetically coupled at a backgap 435 which is spaced from the ABS. The second pole piece layer 426 has a pole tip 432 and a yoke 442, the separation between these components being defined by the apex 444 of the second insulation layer 420. The yoke 442 extends from the apex 444 of the second insulation layer 420 to termination of the first insulation layer 418 at a termination point 446 at the backgap 435.

The length of the yoke 442 is an important design parameter affecting the efficiency of the write head. The shorter the length of the yoke 442, the higher the efficiency of the coil 416 in providing the desired magnetic flux at the pole tip 432 for writing data on a disk.

Another important design parameter in making the write head portion 402, is the apex angle α formed at the apex 444 of the second insulation layer 420. The apex angle α is the angle that the second insulation layer 420 makes with the plane 445 of the pole tip 432 at the apex 444. The apex angle α, which for a given head design is a function of the combined thickness of the first and second insulation layers 418 and 420 and the coil layer 416, affects definition of the sidewalls of the pole tip 432 because of reflective notching during the second pole tip photoresist mask exposure step caused by light reflected from the sloping surfaces of the second insulation layer 420 in the apex region. The severity of this reflective notching problem in the pole tip region is known to the art to increase with increased apex angle α.

In the fabrication of the read/write head 400, the first insulation layer 418 of the write head portion 402 is typically formed of photoresist material deposited by a spin coating process followed by heat treatment to form a hard-baked photoresist layer having a thickness in the range of 1.5–2 $\mu$m. The second insulation layer 420 is also formed of a hard-baked photoresist layer similarly formed by spin coating photoresist over the coil layer 416. The thickness of the second insulation layer 420 is in the range of 1–2 $\mu$m.

The micron range thicknesses of the first and second insulation layers 418 and 420 are dictated by the need to electrically insulate the coil layer 416 from the first and second pole layers 424 and 426 and by the spin coating process of deposition of these insulation layers. An objective of the present invention is to improve the performance of the write head portion 402 of read/write head 400 by improving the structure and materials of the insulating layers comprising the insulation stack. A further objective of the present invention is to improve the thermal stability of the read/write head layer structure to improve head reliability.

EXAMPLE 2

Preferred Embodiment of Invention

Figure 5:
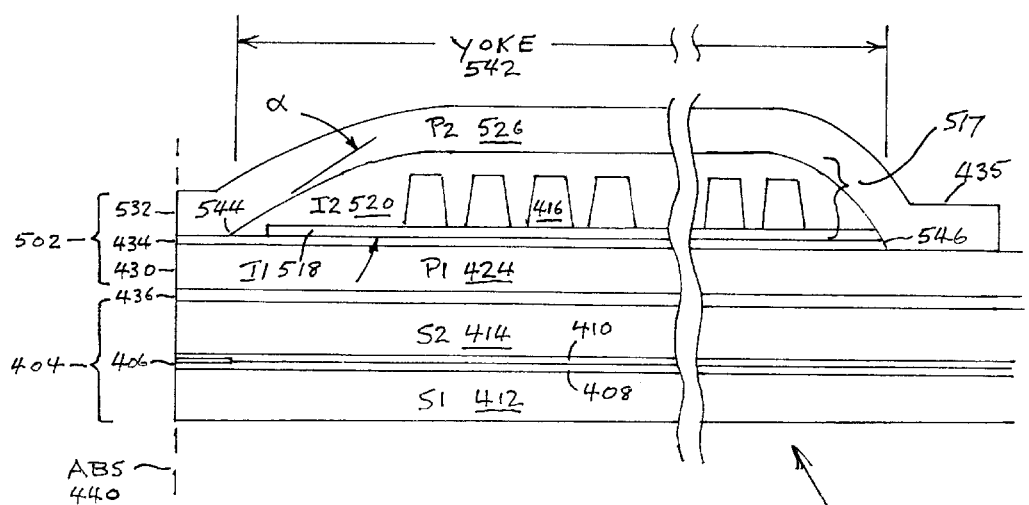
FIG. 5 is a vertical cross-section view, not to scale, of a lower profile and lower apex angle read/write magnetic head according to an embodiment of the present invention.
Figure 6:
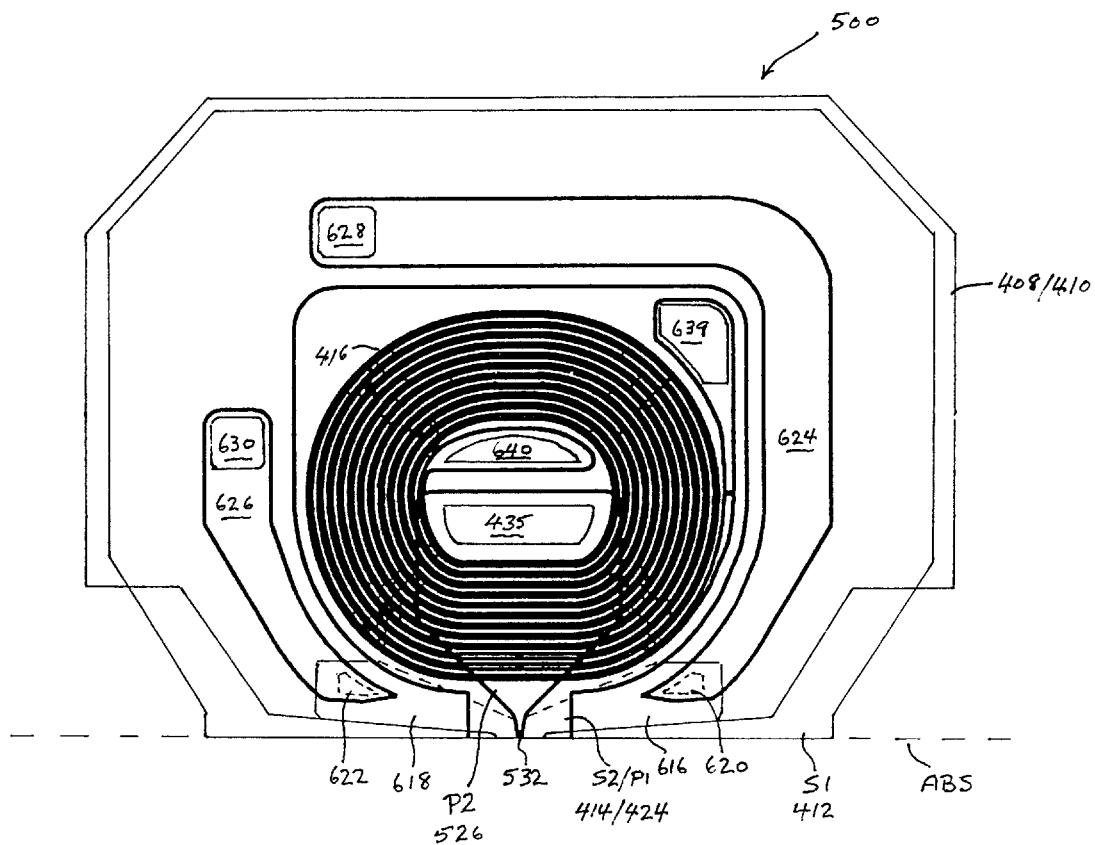
FIG. 6 is a planar illustration of a low profile read/write head according to an embodiment of the present invention.

The read/write head 500 in FIGS. 5 and 6 is a preferred embodiment of the present invention. The read head portion 404 of the read/write head 500 is the same as the read head portion of the read/write head 400. The write head portion 502 of the head includes a coil layer 416 and an insulation stack 517 comprising first and second insulation layers 518 and 520. The coil layer 416 is sandwiched between the first and second insulation layers 518 and 520. However, the first insulation layer 518 is a much thinner layer than the first insulation layer 418 of the write head portion 402 of Example 1. A third insulation layer 422 may be used for planarizing the head to eliminate ripples in the second insulation layer caused by the coil layer 416. The coil layer 416, and the first and second insulation layers 518 and 520 are sandwiched between first and second pole piece layers 424 and 526. The first and second pole piece layers 424 and 526 are separated by a write gap layer 434 at the ABS 440 and are magnetically coupled at a backgap 435 which is spaced from the ABS. The second pole piece layer 526 has a pole tip 532 and a yoke 542, the separation between these components being defined by the apex 544 of the second insulation layer 520. The yoke 542 extends from the apex 544 of the second insultaion layer 520 to termination of the first insulation layer 518 at a termination point 546 at the backgap 435.

The first insulation layer 518 of the read/write head 500 is formed by depositing a layer of insulating material such as aluminum oxide ($Al_2O_3$), silicon dioxide ($SiO_2$), titanium dioxide ($TiO_2$) or other nonmagnetic inorganic dielectric material on the write gap layer 434. In the preferred embodiment, the first insulation layer is formed of $Al_2O_3$ by sputter depositing and then plasma oxidizing a layer of aluminum (Al), or alternatively, by sputter deposition of $Al_2O_3$. In contrast to the first insulation layer 418 of the read/write head 400 which is formed of hard-baked photoresist material having a thickness in the range of 1.5–2 $\mu$m, the first insulation layer 418 of the read/write head 500 can have a thickness of about 0.2 $\mu$m for providing electrical isolation of the coil layer 416 from the first pole layer 424. In the preferred embodiment, the second insulation layer 520 has a thickness of in the range of 0.5–1.5 $\mu$m over the coil layer 416 resulting in the insulation stack 517 having a thickness in the range of 2–4 $\mu$m.

Because the thickness of the first insulation layer 518 is reduced to about 0.2 $\mu$m from the approximately 1.5–2 $\mu$m of the first insulation layer 418 of Example 1, the apex point 544 and the termination point 546 at the back gap 435 can be located closer to each other in the read/write head 500 resulting in a shorter yoke 542 than the yoke 442 of the read/write head 400. For an identical coil layer geometry in the read/write heads 400 and 500, the yoke length of the read/write head 500 of the preferred embodiment of the invention is approximately 6 $\mu$m shorter than the yoke of Example 1. The reduced yoke length results in improved write head efficiency. Because of this increased efficiency, the coil layer thickness and the write current can be reduced to produce an equivalent flux gradient at the pole tip.

Another advantage of the decreased thickness of the first insulation layer 518 of the preferred embodiment of the invention is that the apex angle $\alpha$ at the apex 544 of the second insulation layer 526 is significantly reduced from a range of about 32°–33° to about 20°–25° due to the reduced slope of the surface of the second insulation layer 520 at the apex 544 and the reduced thickness of the coil layer 416. The reduced apex angle $\alpha$ results in a decrease in reflected ultraviolet light from the front slope of the insulation stack allowing improved definition of the second pole tip 532.

FIG. 6 is a plan view of the low profile read/write head 500 shown in FIG. 5. The second shield layer 414 is separated from the first shield layer 412 by first and second gap layers 408 and 410 of alumina. The first pole piece layer 424 and the underlying second shield layer 414 have sufficient area to support the coil layer 416 in order to provide a planar coil layer and to eliminate shadowing effects in the deposition process of the coil layer. FIG. 6 shows an exemplary arrangement for first and second leads 616 and 618 which connect the MR sensor 406 to the recording channel 125 shown in FIG. 1. The first and second leads 616 and 618 are connected to first and second conductors 624 and 626, respectively, at conductive vias 620 and 622. The conductors 624 and 626 are in turn connected by conductive vias 628 and 630 to leads (not shown) which extend to the recording channel 125. The write coil 416 is connected to write coil pads 639 and 640 which are connected to leads (not shown) which extend to the recording channel 125.

The low profile read/write head 500 wherein the first insulation layer 518 is formed of inorganic dielectric material such as $Al_2O_3$ as shown in FIGS. 5 and 6 has a number of improvements and advantages over the read/write head of Example 1 shown in FIG. 4. The first insulation layer 518 of inorganic dielectric material can be much thinner than the first insulation layer 418 formed of hard-baked photoresist of the read/write head 400 because of the better dielectric properties of the inorganic dielectric materials and because the insulation layer 518 can be deposited a by a sputtering process instead of the spin coating process for depositing the photoresist material. The first insulation layer 518 of $Al_2O_3$ having a thickness in the range of 0.2–0.3 $\mu$m together with the write gap layer 434 of $Al_2O_3$ having a thickness of about 0.2 $\mu$m provide electrical isolation of the coil layer 416 from the first pole piece layer The reduced thickness of the first insulation layer 518 reduces the profile of the write head resulting in a reduced apex angle $\alpha$ and a shorter yoke 542. The improved definition of the second pole tip 532 resulting from the reduced apex angle $\alpha$, with the concomitant reduction in reflective notching during photoresist exposure, improves the write track definition of data tracks on the disk surface during writing operations.

Another significant advantage of having the first insulation layer 518 formed of a thin inorganic dielectric material instead of the 1.52 $\mu$m organic material is that heat conduction from the coil layer during writing operations is improved. The improved thermal conductivity of a thin inorganic dielectric material of the preferred embodiment relative to the thicker photoresist material of the read/write of Example 1 allows heat generated by write current flowing in the write coil to be transferred away from the read/write head to the substrate more easily. The improved heat sinking of the coil layer 416 results in less heating of the read/write head which, together with the reduced thickness of the second and third insulator layers decreasing the amount of organic insulator material, results in reduced overcoat and pole tip protrusion and reduced cracking of an overcoat layer due to expansion of the insulation stack.

Figure 7:
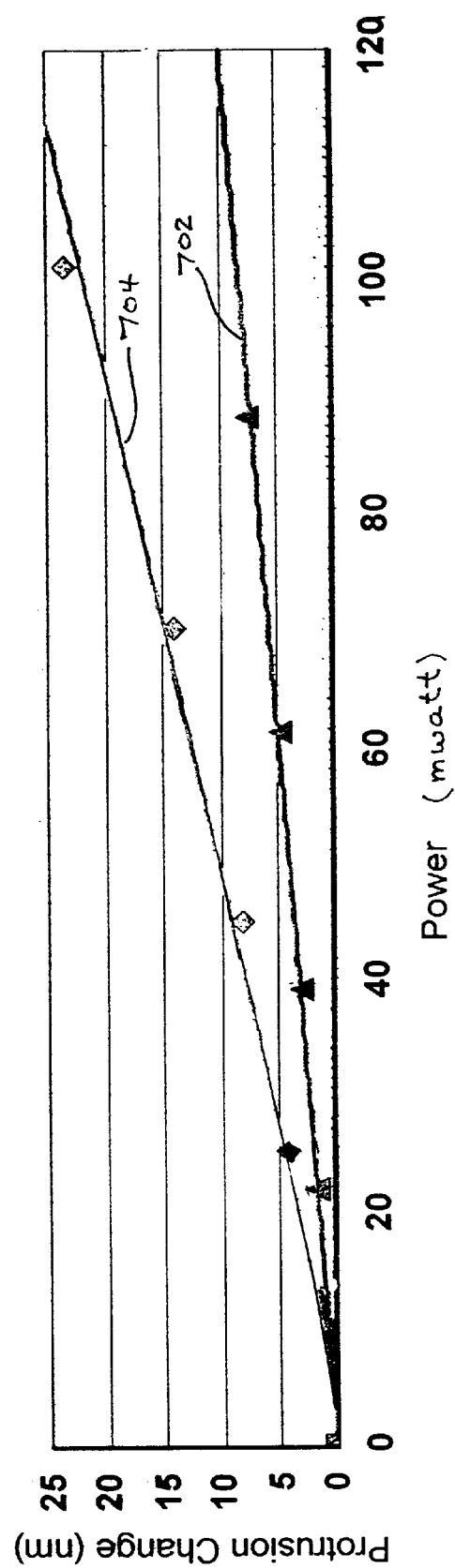
FIG. 7 is a graph of the protrusion change as a function of writing input power for a standard profile read/write head and for the low profile read/write head of the present invention.

FIG. 7 is a graph of the protrusion from the ABS toward the disk surface as a function of electrical power input to the write coil comparing the read/write head of the preferred embodiment with the read/write head of the type shown in Example 1. Curve 702 was obtained using the lower profile read/write head of FIG. 5 with a coil layer 416 having a coil pitch of 3.0 $\mu$m (center-to-center spacing of coil windings). Curve 704 was obtained using the prior art read/write head of FIG. 4 with a coil layer 416 having a coil pitch of 3.5 $\mu$m. In spite of the narrower coil pitch of the preferred embodiment read/write head (3.0 $\mu$m versus 3.5 $\mu$m) with its increased power density, the protrusion is only about 40% of the protrusion measured in the prior art read/write head. Since the ABS is normally spaced in the range of 25 to 50 nm from the disk, having a protrusion change smaller than 10 nm can result in a significant decrease in the probability of head/disk contacts with resulting increased reliability.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only in scope as specified in the appended claims.

We claim:

1. An inductive write head having a pole tip located between an air bearing surface (ABS) and an apex of a second insulation layer, and a yoke located between the apex and a back gap, wherein the back gap is a location recessed from the ABS where first and second pole pieces are magnetically connected, comprising:

first and second pole piece layers, the second pole piece layer having a pole tip and a yoke, the pole tip extending from an ABS end, which is located at said ABS, to a recessed end which is located at the apex, and the yoke extending from the apex, which is spaced from the ABS, to said back gap;

a first insulation layer of non-magnetic inorganic dielectric material extending from a recessed end, which is recessed from the apex away from the ABS, to the back gap;

a write gap layer sandwiched between the first pole piece layer and the first insulation layer, said write gap layer extending from the ABS to the back gap;

a coil layer formed on the first insulation layer; and a second insulation layer sandwiched between the first insulation layer and the yoke of the second pole piece and overlaying the coil layer, the said second insulation layer extending from the apex, which is recessed from the ABS, to the back gap, said second insulation layer having a sloped surface forming an apex angle at the apex.

2. The inductive write head as recited in claim 1, wherein said first insulation layer is made of aluminum oxide ($Al_2O_3$).

3. The inductive write head as recited in claim 2, wherein said first insulation layer has a thickness in the range of 0.2–0.3 microns.

4. The inductive write head as recited in claim 1, wherein said first insulation layer is selected from a group of materials consisting of aluminum oxide ($Al_2O_3$), silicon dioxide ($SiO_2O$), and titanium dioxide ($TiO_2$).

5. The inductive write head as recited in claim 1, wherein an insulation stack comprising said first and second insulation layers has a thickness in the range of 2–4 microns.

6. The inductive write head as recited in claim 1, wherein the apex angle is in the range of 20°–25°.

7. A magnetic read/write head comprising:

an inductive write head having a pole tip located between an air bearing surface (ABS) and an apex of a second insulation layer, and a yoke located between the apex and a back gap, wherein the back gap is a location recessed from the ABS where first and second pole pieces are magnetically connected, comprising:

first and second pole piece layers, the second pole piece layer having a pole tip and a yoke, the pole tip extending from an ABS end, which is located at said ABS, to a recessed end which is located at the apex, and the yoke extending from the apex, which is spaced from the ABS, to said back gap;

a first insulation layer of non-magnetic inorganic dielectric material extending from a recessed end, which is recessed from the apex away from the ABS, to the back gap;

a write gap layer sandwiched between the first pole piece layer and the first insulation layer, said write gap layer extending from the ABS to the back gap;

a coil layer formed on the first insulation layer; and a second insulation layer sandwiched between the first insulation layer and the yoke of the second pole piece and overlaying the coil layer, the said second insulation layer extending from the apex, which is recessed from the ABS, to the back gap, said second insulation layer having a sloped surface forming an apex angle at the apex;

a read head including:
   a magnetoresistive sensor;
   first and second gap layers;
   first and second shield layers;
   the magnetoresistive sensor being sandwiched between the first and second gap layers and the first and second gap layers being sandwiched between the first and second shield layers; and an insulation layer disposed between the second shield layer of the read head and the first first pole piece layer of the write head.

8. The magnetic read/write head as recited in claim 7, wherein said first insulation layer is made of aluminum oxide ($Al_2O_3$).

9. The magnetic read/write head as recited in claim 8, wherein said first insulation layer has a thickness in the range of 0.2–0.3 microns.

10. The magnetic read/write head as recited in claim 7, wherein said first insulation layer is selected from a group of materials consisting of aluminum oxide ($Al_2O_3$), silicon dioxide ($SiO_2O$), and titanium dioxide ($TiO_2$).

11. The magnetic read/write head as recited in claim 7, wherein an insulation stack comprising said first and second insulation layers has a thickness in the range of 2–4 microns.

12. The magnetic read/write head as recited in claim 7, wherein the apex angle is in the range of 20°–25°.

13. A disk drive system comprising:
   a magnetic recording disk;
   a magnetic read/write head for magnetically recording data on the magnetic recording disk and for sensing magnetically recorded data on the magnetic recording disk, said magnetic read/write head comprising:
   an inductive write head having a pole tip located between an air bearing surface (ABS) and an apex of a second insulation layer, and a yoke located between the apex and a back gap, wherein the back gap is a location recessed from the ABS where first and second pole pieces are magnetically connected, comprising:
   first and second pole piece layers, the second pole piece layer having a pole tip and a yoke, the pole tip extending from an ABS end, which is located at said ABS, to a recessed end which is located at the apex, and the yoke extending from the apex, which is spaced from the ABS, to said back gap;
   a first insulation layer of non-magnetic inorganic dielectric material extending from a recessed end, which is recessed from the apex away from the ABS, to the back gap;
   a write gap layer sandwiched between the first pole piece layer and the first insulation layer, said write gap layer extending from the ABS to the back gap;
   a coil layer formed on the first insulation layer; and
   a second insulation layer sandwiched between the first insulation layer and the yoke of the second pole piece and overlaying the coil layer, the said second insulation layer extending from the apex, which is recessed from the ABS, to the back gap, said second insulation layer having a sloped surface forming an apex angle at the apex;

a read head including:
 a magnetoresistive sensor;
 first and second gap layers;
 first and second shield layers;
 the magnetoresistive sensor being sandwiched between the first and second gap layers and the first and second gap layers being sandwiched between the first and second shield layers; and
 an insulation layer disposed between the second shield layer of the read head and the first first pole piece layer of the write head;

an actuator for moving said magnetic read/write head across the magnetic disk so that the read/write head may access different regions of the magnetic recording disk; and a recording channel coupled electrically to the write head for magnetically recording data on the magnetic recording disk and to the SV sensor of the read head for detecting changes in resistance of the SV sensor caused by rotation of the magnetization axis of the free ferromagnetic layer relative to the fixed magnetization of the AP-pinned layer in response to magnetic fields from the magnetically recorded data.

14. The disk drive system as recited in claim 13, wherein said first insulation layer is made of aluminum oxide ($Al_2O_3$).

15. The disk drive system as recited in claim 14, wherein said first insulation layer has a thickness in the range of 0.2–0.3 microns.

16. The disk drive system as recited in claim 13, wherein said first insulation layer is selected from a group of materials consisting of aluminum oxide ($Al_2O_3$), silicon dioxide ($SiO_2O$), and titanium dioxide ($TiO_2$).

17. The disk drive system as recited in claim 13, wherein an insulation stack comprising said first and second insulation layers has a thickness in the range of 2–4 microns.

18. The disk drive system as recited in claim 13, wherein the apex angle is in the range of 20°–25°.

* * * * *